United States Patent Office 3,511,147
Patented May 12, 1970

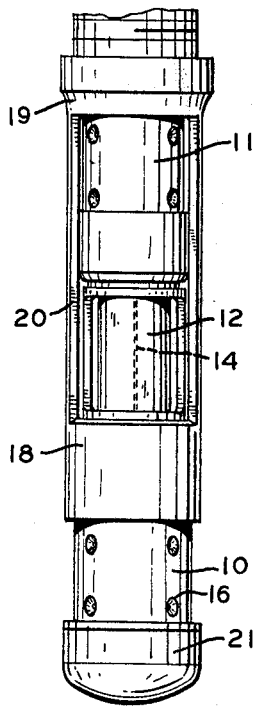
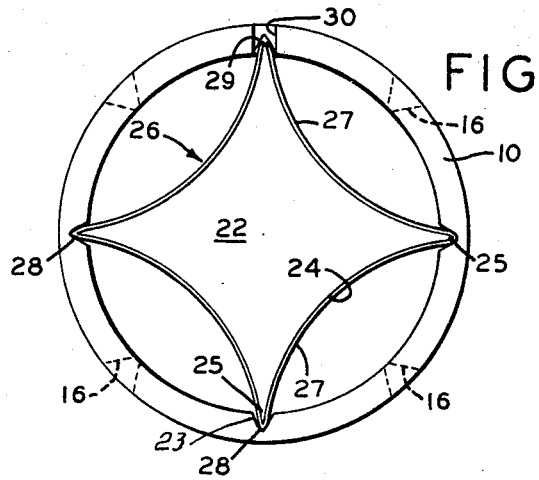
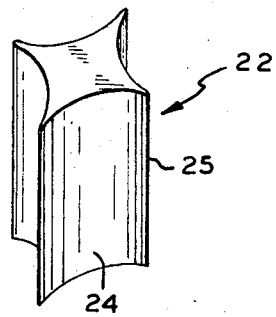
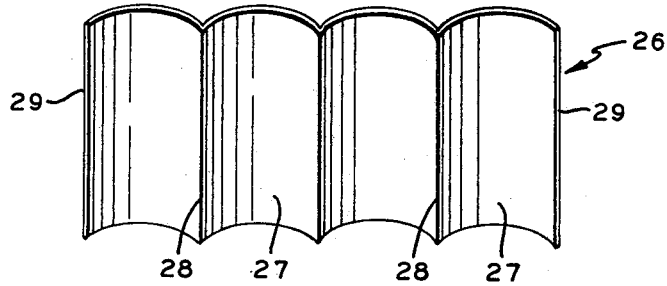
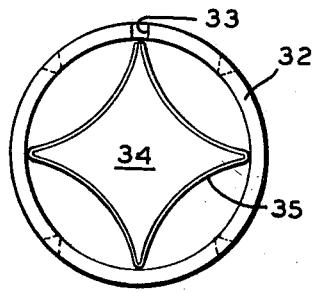

3,511,147
APPARATUS FOR TAKING PHOTOGRAPHS OF CLOSED CAVITIES IN A BODY
John Falenks, Red Hook, N.Y., assignor to Diversified Medical Corporation, Scarsdale, N.Y., a corporation of Delaware
Filed June 16, 1967, Ser. No. 649,071
Int. Cl. G03b 19/06
U.S. Cl. 95—11     2 Claims

ABSTRACT OF THE DISCLOSURE

In an apparatus for taking photographs of closed cavities and provided with a tube having spaced exposure openings, an impressed film support consisting of a mandrel with longitudinally extending corners which are arranged to enter grooves in the tube, and a closure member for the tube. The mandrel has concave areas between each pair of corners, and a single film extending around the mandrel with its opposed ends meeting in abutting relation at one of the corners and provided with crease lines receiving the remaining corners. The mandrel is proportioned so as to form a snug fit in the grooves with the film wrapped therearound.

---

This invention relates to an improvement in an apparatus for taking photographs of closed cavities in a body such as the stomach of the human body. A number of these small photographic devices have proven quite satisfactory and the apparatus disclosed in U.S. Pat. No. 2,349,932 is representative. The improvement of the present invention can be incorporated in that apparatus with very little modification.

This apparatus includes two tubular cameras in spaced axial alignment with electric lighting means disposed therebetween, each camera being provided with exposure chambers enclosed by the tubular members, the latter having exposure openings. These tubes are enclosed by slidable cylindrical shutter means which are moved axially after the apparatus is disposed in the cavity, so as to uncover the pin hole openings which exposes the film.

The tubular exposure chambers contained what, in said patent, was termed a "spider" which consisted of a body of plastic or other moldable material of non-circular shape and of a length to extend from the top to the bottom of the chamber. In cross section, this body had four corners which contacted the inner wall of the tube, and between each adjoining pair of corners there was formed a concave wall, thus providing four chambers or slots aligned with the exposure opening, and which received the tiny individual films, four for each camera. Loading the films in darkness presented difficulties which were small, however, compared to the problems in removing the tiny films and placing them in proper sequence and orientation in the development frame, so that after development, they could accurately identify the portion of the stomach to which each related.

The improvement of the present invention also uses a "spider," or, more properly, a mandrel or core, whose corners, however, do not quite touch the walls of the tube, so that one continuous film can be used instead of the four.

The number of film sections is a matter of choice but since four sections have proved most satisfactory, the present invention is described with four of such sections. The film is wrapped around the mandrel and for convenience in inserting the film and mandrel, the inside of the tube may have four equally spaced grooves, which receive the corner of the mandrel and sufficient clearance is provided so that the corners with the film around them are guided into the grooves. The mandrel has the same concave walls between each pair of corners and the film sections extend rearwardly into substantial contact with each concave wall.

To facilitate placing the film in proper rotation on the mandrel with the two opposed ends meeting in abutting relation at one of the corners, the normally flat contour of the film is modified to form creases on fold lines at each portion thereof engaged by the corners. This is accomplished by forming the cutting die with appropriate surfaces to form the crease lines, which should not be too sharp, and slightly concave sections between these crease lines.

The continuous film is thus readily applied to the mandrel with the opposed ends meeting in abutting relation at one of the four corners of the mandrel. In this arrangement, the mandrel is so proportioned relative to the grooves that the corners extend slightly into the grooves.

While this arrangement provides the maximum measure of convenience in inserting the film, good results are obtained by omitting the grooves and simply providing an indexing notch where the corner with the abutting film terminals are to be received.

In the drawing:

FIG. 1 is a broken side elevation of the complete apparatus for taking photographs of cavities of the human body;

FIG. 2 is a body plan view with the cap removed and showing the cylindrical exposure chamber with mandrel and film positioned therein;

FIG. 3 is a perspective view of the mandrel;

FIG. 4 is a perspective view of the film before insertion into the chamber;

FIG. 5 shows a modification.

Only enough of a complete apparatus of the kind disclosed in Pat. No. 2,349,932 is shown to illustrate the improvement constituting the present invention. Two tubular exposure chambers 10 and 11 are mounted in spaced relation with a light source 12 therebetween, the light source having a filament 14. Each tube has small openings 16 to permit exposure of the film contained therein. These openings are arranged to be closed by sleeves 18 and 19 slidably carried on the tube and connected by side pieces 20. A screw cap 21 closes the lower end of the exposure chamber in tube 10 which is removed when loading the film.

The mandrel is shown at 22 and is of a length sufficient to extend from the top to the bottom of the exposure chamber and has four concave side wall sections 24 defined by four corners 25, the recesses being deep enough to meet the optical requirements for a camera of the type with the film carried fairly close to the surface of the recess. The inner wall of the tube has four equally spaced, generally V-shaped grooves 23 extending from top to bottom and the dimensions of the mandrel are such that the corners extend slightly into the grooves but leaving enough clearance for the film to be freely received and be readily removed without binding.

The film 26 is rectangular in shape and its flat surface contour is modified to form four slightly concave sections 27 extending from top to bottom and defined on opposite sides by slight crease lines 28. In this fashion, the film can be readily wrapped around the mandrel or core with the crease lines 28 coinciding with the corners of the mandrel and the ends 29—29 meeting in abutting relation at one of the corners. A shallow indexing notch 30 is used to define the corner at which the ends of the film meet. In actual practice, the formation of the crease lines gives the sections enough of a concave contour to facilitate mounting the film on the mandrel without any separate pressing action to round the rectangular panel. It will be noted that the width of each film section between each pair of corners is greater than the linear distance between the corners so that the film sections are bent rearwardly against the concave walls of the mandrel.

The second camera at the upper end of the unit has the same tube which can be opened and presents the same chamber as earlier described.

In the modification of FIG. 5, the grooves are omitted from the inner wall of the tube 32 and the upper edge of the tube has an indexing notch 33 to indicate where the corner of mandrel 34 with the abutting ends of the film should be placed. The film has the concave recess 35. Sufficient clearance is allowed between the corners and the tube wall to readily receive the mandrel with the film wrapper around it.

The embodiments of the invention in which an exclusive property or privilege is claimed are defined as follows:

1. In an apparatus for taking photographs of closed cavities and provided with a tube defining an area with plural exposure chambers, the tube having spaced exposure openings positioned relative to each exposure chamber, the improvement which consists in forming internal, longitudinal grooves in the tube, corresponding to the number of chambers, and a mandrel with longitudinally extending corners which are arranged to enter the grooves, the mandrel having concave areas between each pair of corners, and a single film extending around the mandrel with its opposed ends meeting in abutting relation at one of the corners and provided with crease lines receiving the remaining corners, the mandrel being proportioned so as to form a snug fit in the grooves with the film wrapped therearound, and closure means for the tube.

2. The structure defined in claim 1 wherein two spaced exposure chambers are provided and an electric light is positioned between the chambers.

References Cited

UNITED STATES PATENTS

| | | | |
|---|---|---|---|
| 2,174,003 | 9/1939 | Ives | 95—18 |
| 2,516,132 | 7/1950 | Marcouiller | 95—11 |

NORTON ANSHER, Primary Examiner

F. L. BRAUN, Assistant Examiner